United States Patent
Nishikiori et al.

(10) Patent No.: US 8,826,891 B2
(45) Date of Patent: Sep. 9, 2014

(54) CONTROL APPARATUS FOR INTERNAL COMBUSTION ENGINE

(75) Inventors: Takashi Nishikiori, Susono (JP); Norihisa Nakagawa, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/878,128

(22) PCT Filed: Dec. 2, 2010

(86) PCT No.: PCT/JP2010/071575
§ 371 (c)(1),
(2), (4) Date: Apr. 5, 2013

(87) PCT Pub. No.: WO2012/073366
PCT Pub. Date: Jun. 7, 2012

(65) Prior Publication Data
US 2013/0239917 A1    Sep. 19, 2013

(51) Int. Cl.
*F02D 17/00*    (2006.01)
*F02D 13/06*    (2006.01)
*F02D 41/00*    (2006.01)

(52) U.S. Cl.
CPC ............ *F02D 17/00* (2013.01); *F02D 41/0087* (2013.01); *F02D 13/06* (2013.01); *F02D 2250/21* (2013.01)
USPC ...................... 123/481; 123/198 F; 123/90.11

(58) Field of Classification Search
CPC ..... F02D 17/00; F02D 17/02; F02D 41/0087; F02D 13/06; F02D 2250/21; F02M 2041/0012; F01L 13/005

USPC ........ 123/198 F, 481, 198 DB, 480, 493, 494, 123/90.11, 90.32; 701/101, 102, 107, 110, 701/114; 73/114.04, 114.11, 114.79
See application file for complete search history.

(56) References Cited

U.S. PATENT DOCUMENTS 6,763,707 B2 * 7/2004 Kumagai et al. ............ 73/114.02
6,950,739 B2 * 9/2005 Matsubara et al. ........... 701/103
(Continued)

FOREIGN PATENT DOCUMENTS

EP    2236798 A1    10/2010
JP    7-189757 A     7/1995
(Continued)

*Primary Examiner* — Thomas Moulis
(74) *Attorney, Agent, or Firm* — Sughrue Mion, PLLC (57) ABSTRACT

Provided is a control apparatus for an internal combustion engine which can successfully determine whether or not a failure concerning a stopping operation of an exhaust valve has occurred, without the need of providing a dedicated sensor for the failure determination. An intake variable valve operating apparatus (62) and an exhaust variable valve operating apparatus (64) are included that have valve stop mechanisms capable of switching each operational state of an intake valve (58) and an exhaust valve (60) between a valve operating state and a valve closed/stopped state. It is determined whether or not a failure concerning a stopping operation of the exhaust valve (60) from the valve operating state to the valve closed/stopped state has occurred, on the basis of the magnitude of the negative torque of when an execution request that is accompanied by a valve stop request to switch each operational state of the intake valve (58) and the exhaust valve (60) from the valve operating state to the valve closed/ stopped state has been issued, in a case in which it is determined that a failure concerning the stopping operation of the intake valve (58) has not occurred.

4 Claims, 6 Drawing Sheets

(56) References Cited

U.S. PATENT DOCUMENTS

| | | |
|---|---|---|
| 7,103,468 B2 * | 9/2006 | Wakashiro et al. ............ 701/110 |
| 7,314,034 B1 * | 1/2008 | Waters et al. .............. 123/198 F |
| 7,353,795 B1 * | 4/2008 | Plant ......................... 123/198 F |
| 7,908,913 B2 * | 3/2011 | Cinpinski et al. .......... 73/114.79 |
| 7,918,210 B2 * | 4/2011 | Gibson et al. ................. 123/481 |
| 8,006,670 B2 * | 8/2011 | Rollinger et al. ............. 123/481 |
| 8,103,433 B2 * | 1/2012 | Hartmann et al. ........... 701/114 |
| 8,666,641 B2 * | 3/2014 | Rollinger et al. ............ 701/114 |
| 2005/0205028 A1 | 9/2005 | Lewis et al. |
| 2006/0243040 A1 | 11/2006 | Reed et al. |
| 2007/0192018 A1 * | 8/2007 | Gibson et al. ................. 701/110 |
| 2008/0092836 A1 * | 4/2008 | Mutti et al. ................ 123/90.16 |
| 2009/0007877 A1 * | 1/2009 | Raiford ...................... 123/192.1 |
| 2009/0277407 A1 | 11/2009 | Ezaki |
| 2010/0031738 A1 * | 2/2010 | Feldkamp et al. ......... 73/114.79 |
| 2010/0175463 A1 * | 7/2010 | Doering et al. ............ 73/114.37 |
| 2012/0173122 A1 * | 7/2012 | Nishikiori et al. ............ 701/103 |

FOREIGN PATENT DOCUMENTS

| | | |
|---|---|---|
| JP | 2004-100486 A | 4/2004 |
| JP | 2004-100487 A | 4/2004 |
| JP | 2008-291850 A | 12/2008 |
| JP | 2009270492 A | 11/2009 |
| JP | 2010-174857 A | 8/2010 |
| WO | 2006/098133 A1 | 9/2006 |

* cited by examiner

*1: Range where failure determination is not performed
*2: Determination value
*3: NE fluctuation (engine rotational acceleration)

CONTROL APPARATUS FOR INTERNAL COMBUSTION ENGINE

CROSS REFERENCE TO RELATED APPLICATIONS

This application is a National Stage of International Application No. PCT/JP2010/071575 filed Dec. 2, 2010, the contents of all of which are incorporated herein by reference in their entirety.

TECHNICAL FIELD

The present invention relates to a control apparatus for an internal combustion engine, and more particular to a control apparatus for an internal combustion engine that is suitable for determining whether or not a failure concerning a stopping operation of an exhaust valve into a valve closed/stopped state from a valve operating state has occurred, in the internal combustion engine that includes a valve stop mechanism that is capable of switching each operational state of an intake valve and the exhaust valve between the valve operating state and the valve closed/stopped state.

BACKGROUND

So far, for example, Patent Document 1 discloses a control apparatus for an internal combustion engine that includes a cylinder halting mechanism that is capable of switching each operational state of an intake valve and an exhaust valve between a valve operating state and a valve closed/stopped state. This conventional control apparatus detects an operation abnormality of the cylinder halting mechanism by use of lift sensors that detect lift amounts of the intake valve and the exhaust valve, and takes appropriate measures in accordance with the condition of the abnormality.

Including the above described document, the applicant is aware of the following documents as related art of the present invention.

CITATION LIST

Patent Documents

Patent Document 1: Japanese Laid-open Patent Application Publication No. 2004-100487
Patent Document 2: Japanese Laid-open Patent Application Publication No. 7-189757
Patent Document 3: Japanese Laid-open Patent Application Publication No. 2004-100486

SUMMARY OF INVENTION

Technical Problem

If a sensor that directly detects the motion of a valve, such as a lift amount sensor equipped with the configuration described in aforementioned Patent Document 1, is included, it can be easily detected whether or not a stopping operation of an exhaust valve has been normally performed. If, however, a dedicated sensor is provided to determine whether or not a failure of the stopping operation of the exhaust valve has occurred, a failure determination for the sensor itself is also needed, and an increase in cost is brought about. Therefore, it is desirable to be able to determine whether or not a failure of the stopping operation of the exhaust valve has occurred by use of a sensor that is included for some control for the internal combustion engine. However, detecting that the stopping operation of the exhaust valve has been done is basically very difficult.

The present invention has been made to solve the problem as described above, and has its object to provide a control apparatus for an internal combustion engine, which can successfully determine whether or not a failure concerning a stopping operation of an exhaust valve has occurred, in the internal combustion engine equipped with a valve stop mechanism capable of switching each operational state of an intake valve and the exhaust valve between a valve operating state and a valve closed/stopped state, without the need of providing a dedicated sensor for the failure determination.

Solution to Problem

A first aspect of the present invention is a control apparatus for an internal combustion engine, comprising:
 a valve stop mechanism that is capable of switching each operational state of an intake valve and an exhaust valve between a valve operating state and a valve closed/stopped state;
 intake valve failure determination means for determining whether or not a failure concerning a stopping operation of the intake valve from the valve operating state to the valve closed/stopped state has occurred;
 negative torque obtaining means for obtaining a negative torque of an internal combustion engine; and
 exhaust valve failure determination means for determining whether or not a failure concerning a stopping operation of the exhaust valve from the valve operating state to the valve closed/stopped state has occurred, on a basis of a magnitude of the negative torque of when an execution request for a fuel cut that is accompanied by a valve stop request to switch each operational state of the intake valve and the exhaust valve from the valve operating state to the valve closed/stopped state has been issued, in a case in which it is determined that a failure concerning the stopping operation of the intake valve has not occurred.

A second aspect of the present invention is the control apparatus for an internal combustion engine according to the first aspect of the present invention,
 wherein the exhaust valve failure determination means determines that a failure concerning the stopping operation of the exhaust valve has occurred, when a torque difference of a current negative torque, with respect to a negative torque of the internal combustion engine in a case in which each stopping operation of the intake valve and the exhaust valve from the valve operating state to the valve closed/stopped state has been normally performed, is a minus value, and when an absolute value of the torque difference is larger than or equal to a predetermined first determination value.

A third aspect of the present invention is the control apparatus for an internal combustion engine according to claim the second aspect of the present invention,
 wherein the control apparatus for the internal combustion engine further includes engine fluctuation obtaining means for obtaining an engine speed fluctuation or a torque fluctuation of the internal combustion engine, and
 wherein the exhaust valve failure determination means determines that a failure concerning the stopping operation of the exhaust valve has occurred, when the engine speed fluctuation or the torque fluctuation is larger than a predetermined second determination value, in a case in which the torque difference is a minus value and the absolute value of the torque difference is smaller than the first determination value.

A fourth aspect of the present invention is the control apparatus for an internal combustion engine according to claim the third aspect of the present invention, wherein the control apparatus for the internal combustion engine further includes rotational acceleration obtaining means for obtaining an engine rotational acceleration, and wherein the exhaust valve failure determination means performs a determination as to whether or not a failure concerning the stopping operation of the exhaust valve has occurred, when the absolute value of the engine rotational acceleration is smaller than a predetermined third determination value.

A fifth aspect of the present invention is the control apparatus for an internal combustion engine according to any one of the first to fourth aspects of the present invention, wherein the exhaust valve failure determination means determines that the number of cylinders in which a failure concerning the stopping operation of the exhaust valve has occurred is larger in a case in which the torque difference is large on a minus side as compared with a case in which the torque difference is small on the minus side.

Advantageous Effects of Invention

In a cylinder in which the stopping operation of the exhaust valve has been normally performed in a situation in which the stopping operation of the intake valve has been normally performed, flow loss of working gas disappears and therefore, a crankshaft becomes very easy to rotate. On the other hand, in a cylinder in which the stopping failure of the exhaust valve has occurred, the crankshaft becomes hard to rotate due to a presence of flow of the working gas via the exhaust valve, and a negative torque of the internal combustion engine becomes larger than that in a case in which the stopping operations of the intake and exhaust valves have been normally performed. The present invention makes it possible to successfully determine whether or not a failure concerning the stopping operation of the exhaust valve has occurred by use of the negative torque of the internal combustion engine having such a tendency, without the need of providing a dedicated sensor for the failure determination.

When the stopping failures of the exhaust valves have occurred at a plurality of cylinders, the aforementioned torque difference becomes larger on the minus side. In such a case, the second aspect of the present invention makes it possible to determine whether or not the stopping failures of the exhaust valves have occurred by use of only the torque difference.

If the stopping failure is difficult to be determined by only the torque difference due to the fact that the number of cylinders in which the stopping failure has occurred is small, the third aspect of the present invention additionally uses the engine speed fluctuation or the torque fluctuation as a parameter for the failure determination and can thereby successfully determine the stopping failure of the exhaust valve.

According to the fourth aspect of the present invention, the aforementioned determination of the stopping failure of the exhaust valve is allowed to be performed in an operating region in which a noise superposed over the engine speed fluctuation or the torque fluctuation is small, and erroneous determination of the stopping failure can therefore be prevented.

According to the fifth aspect of the present invention, the number of cylinders in which the stopping failure of the exhaust valve has occurred can be determined.

DESCRIPTION OF EMBODIMENT

First Embodiment

Configuration of HV System

Figure 1:
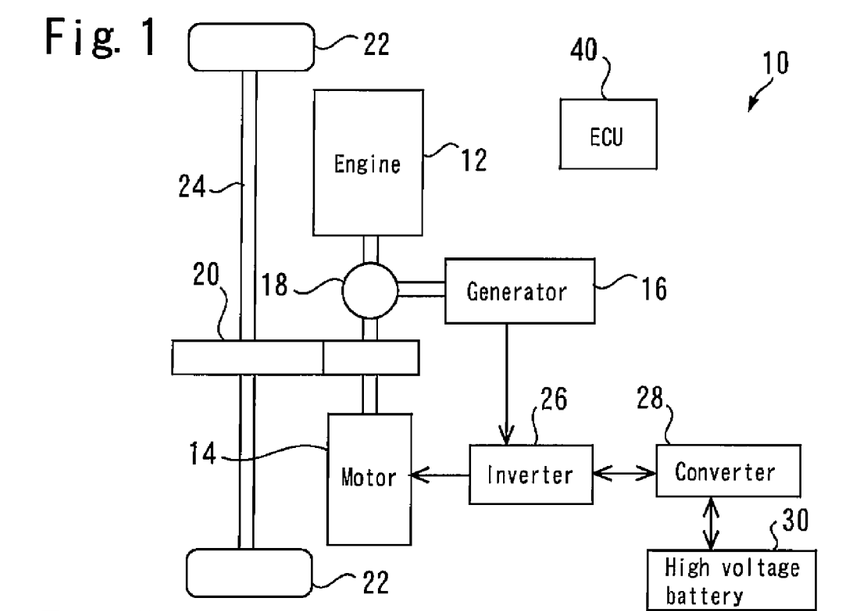
FIG. 1 is a diagram to show an outline configuration of a drive system of a hybrid vehicle to which the present invention is applied.

FIG. 1 is a diagram to show an outline configuration of a drive system 10 of a hybrid vehicle to which the present invention is applied. This drive system 10 includes a motor for driving the vehicle (hereafter, simply referred to as a "motor") 14 as the second power source for the vehicle in addition to an internal combustion engine 12. In addition, the drive system 10 also includes a generator 16 that receives the supply of a driving force to generate electric power. The internal combustion engine 12, the motor 14 and the generator 16 are interlinked via a power split mechanism 18 of planetary gear type. A speed reducer 20 is connected to the rotating shaft of the motor 14 in connection with the power split mechanism 18. The speed reducer 20 links the rotating shaft of the motor 14 with a driving shaft 24 which leads to driving wheels 22. The power split mechanism 18 is an apparatus to split the driving force of the internal combustion engine 12 into the generator 16 side and the speed reducer 20 side. The distribution of the driving force by the power split mechanism 18 can be freely changed.

The drive system 10 further includes an inverter 26, a converter 28 and a high voltage battery 30. The inverter 26 is connected to the generator 16 and the motor 14, and is also connected to the high voltage battery 30 via the converter 28. The electric power generated at the generator 16 can be supplied to the motor 14 via the inverter 26, and also can be charged to the high voltage battery 30 via the inverter 26 and the converter 28. Moreover, the electric power charged in the high voltage battery 30 can be supplied to the motor 14 via the converter 28 and the inverter 26.

According to the drive system 10 as so far described, based on a predetermined condition the driving wheels 22 can be rotated by the driving force of the internal combustion engine 12 alone with the motor 14 being deactivated, and conversely the driving wheels 22 can be rotated by the driving force of the motor 14 alone with the internal combustion engine 12 being deactivated. Moreover, it is also possible to activate both of the motor 14 and the internal combustion engine 12 and to rotate the driving wheel 22 by both the driving forces. Further, the generator 16 is allowed to function as a starter to drive the internal combustion engine 12, and thereby, the start up of the internal combustion engine 12 can be controlled.

The drive system 10 of the present embodiment is controlled by an ECU (Electronic Control Unit) 40. The ECU 40 comprehensively controls the entire drive system 10 including the internal combustion engine 12, the motor 14, the generator 16, the power split mechanism 18, the inverter 26, the converter 28 and the like.

[System Configuration of Internal Combustion Engine]

Figure 2:
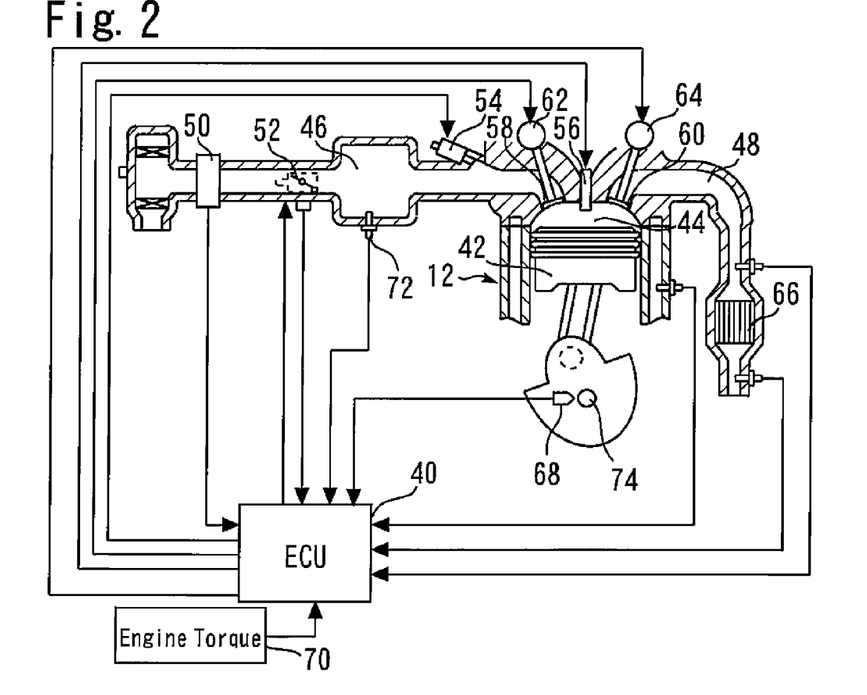
FIG. 2 is a diagram for explaining the system configuration of an internal combustion engine shown in FIG. 1.

FIG. 2 is a diagram for explaining the system configuration of the internal combustion engine 12 shown in FIG. 1. Here, the internal combustion engine 12 is supposed to be a straight 4-cylinder engine which includes four cylinders (#1 to #4) and in which explosion strokes are performed at uniform intervals in the order (for example) of #1 to #3, to #4, and to #2. Each of cylinders of the internal combustion engine 12 contains a piston 42. Each of the cylinders of the internal combustion engine 12 has a combustion chamber 44 formed atop the piston 42. An intake passage 46 and an exhaust passage 48 are communicated with the combustion chamber 44.

An air flow meter 50 is installed in the vicinity of the inlet of the intake passage 46 to output a signal representing the flow rate of the air taken into the intake passage 46. A throttle valve 52 is installed downstream of the air flow meter 50. The throttle valve 52 is an electronically controlled throttle valve that can control an opening degree of the throttle valve independently of a press-down degree of an accelerator.

A fuel injection valve 54 for injecting a fuel into an intake port of the internal combustion engine 12 is disposed downstream with respect to the throttle valve 52. At a cylinder head of the internal combustion engine 12, an ignition plug 56 is mounted in such a form as to project from an upper section of the combustion chamber 44 into the combustion chamber 44. An intake valve 58 and an exhaust valve 60 are provided at the intake port and an exhaust port, respectively. The intake valve 58 establishes continuity or discontinuity between the combustion chamber 44 and the intake passage 46, and the exhaust valve 60 establishes continuity or discontinuity between the combustion chamber 44 and the exhaust passage 48.

The intake valve 58 and the exhaust valve 60 are driven by an intake variable valve operating apparatus 62 and an exhaust variable valve operating apparatus 64, respectively. It is assumed that the intake variable valve operating apparatus 62 includes a valve stop mechanism (not shown) that is capable of switching the operational state of the intake valve 58 between the valve operating state and the valve closed/stopped state for each cylinder, and similarly, the exhaust variable valve operating apparatus 64 includes a valve stop mechanism (not shown) that is capable of switching the operational state of the exhaust valve 60 between the valve operating state and the valve closed/stopped state for each cylinder. The concrete configurations of the aforementioned valve stop mechanisms are not specifically limited, and can be realized by means of for example, a configuration that is capable of halting a rocking action of a rocker arm that transmits an acting force of a cam to a valve using a switching pin.

Furthermore, a catalyst 66 for purifying exhaust gas is disposed in the exhaust passage 48. Moreover, an input section of the aforementioned ECU 40 is connected with various types of sensors for detecting the operating state of the internal combustion engine 12, such as a crank angle sensor 68 for detecting an engine speed (crank angular velocity), a torque sensor 70 for detecting a torque of the internal combustion engine 12, and an intake pressure sensor 72 for detecting an intake pressure, as well as the air flow meter 50 that is described above. An output section of the ECU 40 is connected with various types of actuators for controlling the internal combustion engine 12 as well as the throttle valve 52, the fuel injection valve 54, the ignition plug 56, the intake variable valve operating apparatus 62 and the exhaust variable valve operating apparatus 64 that are described above. The ECU 40 can control the operating state of the internal combustion engine 12 on the basis of outputs of those sensors.

If fresh air that has a high oxygen concentration is supplied into the catalyst 66 in a case in which the catalyst 66 that is disposed in the exhaust passage 48 is in a high temperature state, there is a concern that deterioration of the catalyst 66 will arise. In order to suppress the deterioration of the catalyst 66, it is effective to prevent the oxygen from flowing into the catalyst 66. According to the system of the present embodiment that includes the aforementioned variable valve operating apparatuses 62 and 64, when a request to execute a fuel cut (FIC) has been issued at the time of deceleration, high engine speed or the like, the operational state of at least one of the intake valve 58 and the exhaust valve 60 in all of the cylinders is switched to the valve closed/stopped state from the valve operating state in synchronization with the fuel cut, and thereby, the oxygen can be prevented from flowing into the catalyst 66 during the fuel cut. This makes it possible to suppress the deterioration of the catalyst 66.

[Determination Method of Stopping Failure of Exhaust Valve]

Hereinafter, a method for determining whether or not a failure concerning a stopping operation of the exhaust valve 60 for switching the valve operating state to the valve closed/stopped state has occurred will be described with reference to FIGS. 3 to 7. More specifically, when an execution request for a fuel cut that is accompanied by a stopping request of the intake valve 58 and the exhaust valve 60 for switching the valve operating state to the valve closed/stopped state has been issued, the present embodiment performs a determination as to whether or not a failure concerning the stopping operation of the exhaust valve 60 for switching the valve operating state to the valve closed/stopped state, that is to say, a failure (hereinafter, may be simply referred to as a "stopping failure of the exhaust valve 60") in which a switching of the operational state of the exhaust valve 60 toward the valve closed/stopped state has not been normally performed in synchronization with the fuel cut, has occurred.

Figure 3:
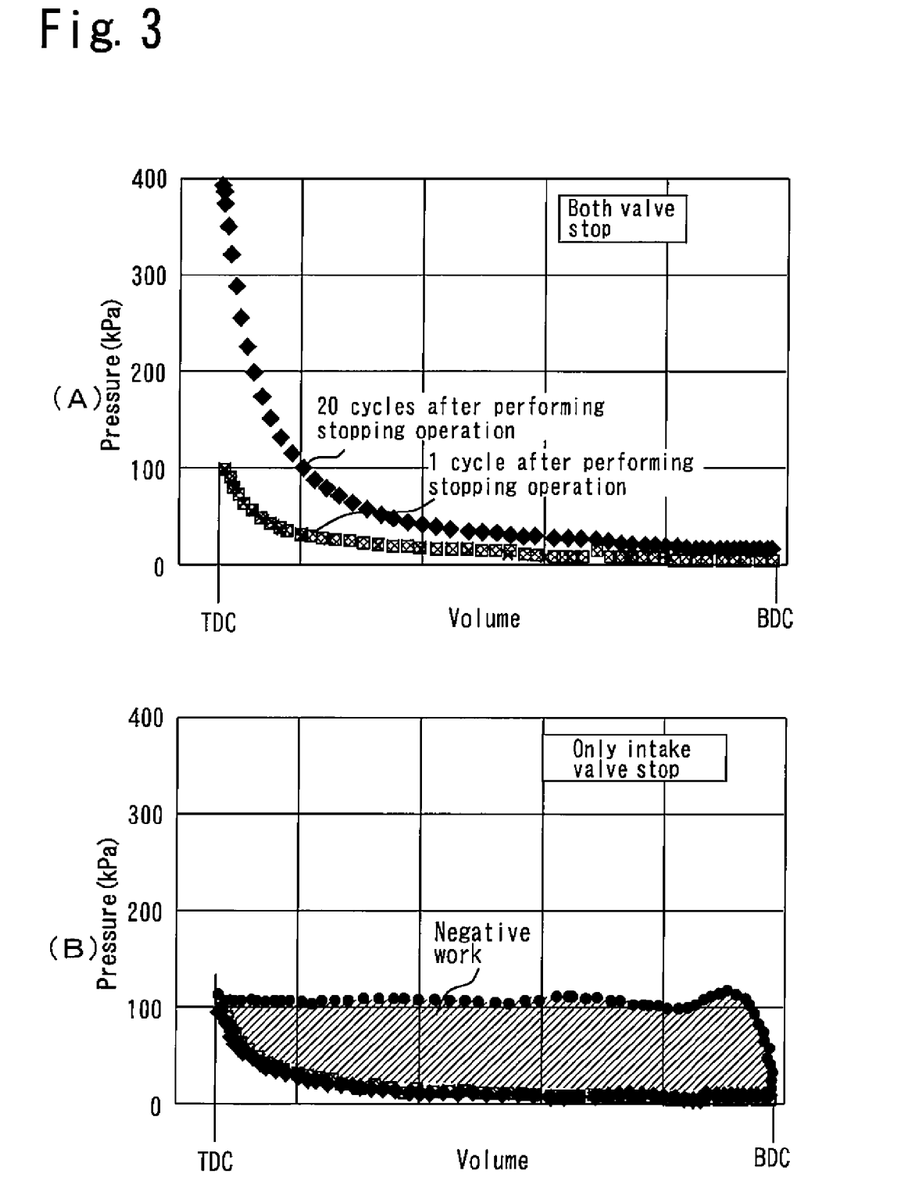
FIG. 3 is a P-V diagram in a situation in which a fuel cut is being executed.
Figure 4:
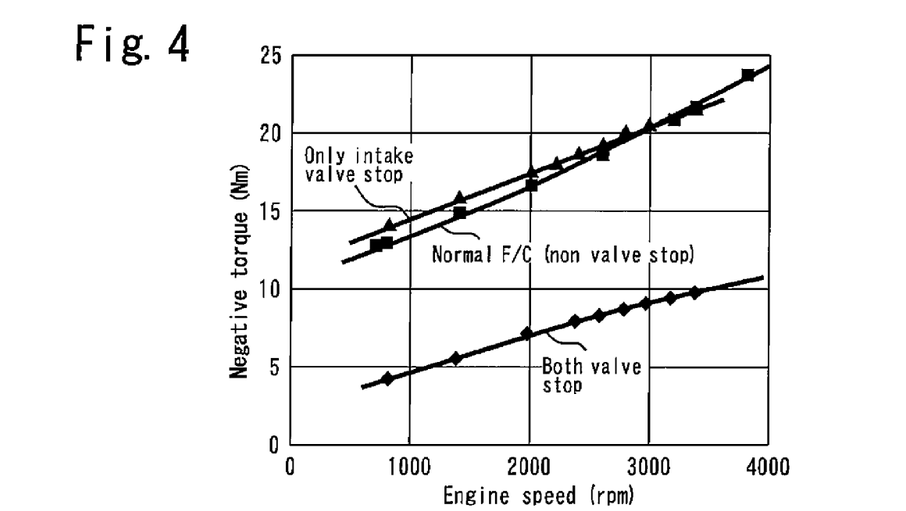
FIG. 4 is a diagram representing a relation between a negative torque and an engine speed of the internal combustion engine concerning a case in which stopping operations of an intake valve and the exhaust valve are performed and a case in which those are not performed.

FIG. 3 is a P-V diagram in a situation in which a fuel cut is being executed. More specifically, FIG. 3(A) is a P-V diagram in a situation in which a fuel cut is being executed when the stopping operations of both of the intake and exhaust valves 58 and 60 have been normally performed, and FIG. 3(B) is a P-V diagram in a situation in which a fuel cut is being executed when the stopping operation of only the intake valve 58 has been normally performed. In addition, FIG. 4 is a diagram representing a relation between a negative torque and an engine speed of the internal combustion engine 12 concerning a case in which the stopping operations of the intake and exhaust valves 58 and 60 are performed and a case in which those are not performed.

As shown in FIG. 3(A), in a case in which the stopping operations of both of the intake and exhaust valves 58 and 60 have been normally performed, the value itself of the in-cylinder pressure shows a change in accordance with the number of cycles elapsed after performing the stopping operation, and however, there comes a state in which flow loss of working gas in the cylinder is not present. Therefore, in this case, the crankshaft 74 becomes very easy to rotate, and the value of the negative torque of the internal combustion engine 12 (crankshaft 74) becomes small also as shown in FIG. 4.

On the other hand, in a case in which the stopping operation of only the intake valve 58 has been normally performed, the exhaust valve 60 is opened at the exhaust stroke, and therefore, it turns out that negative work is generated, as shown in FIG. 3(B). More specifically, in a case in which the stopping operation of only the intake valve 58 has been normally performed, flow of the working gas via the exhaust valve 60 that is in the valve operating state is present. As a result of this, the crankshaft 74 becomes harder to rotate as compared with a case in which the stopping operations of both the valves have been performed, and also as shown in FIG. 4, the negative torque of the internal combustion engine 12 becomes larger as compared with a case in which the stopping operations of both of the intake and exhaust valves 58 and 60 are normally performed, and further, becomes a value equivalent to a negative torque (a value designated "Normal FIC" in FIG. 4) at normal fuel cut in which the stopping operations of the intake and exhaust valves 58 and 60 are not performed.

Accordingly, for the reason described so far, when the stopping operation of only the intake valve 58 has been normally performed and a failure of the stopping operation of the exhaust valve 60 has occurred in a case in which a request to stop the intake and exhaust valves 58 and 60 has been issued, the negative torque of the internal combustion engine 12 becomes larger as compared with a case in which the stopping operation of the exhaust valve 60 is normally performed. In addition, the negative torque increases as the number of cylinders in which a failure of the stopping operation of the exhausts valve 60 has occurred increases.

Figure 5:
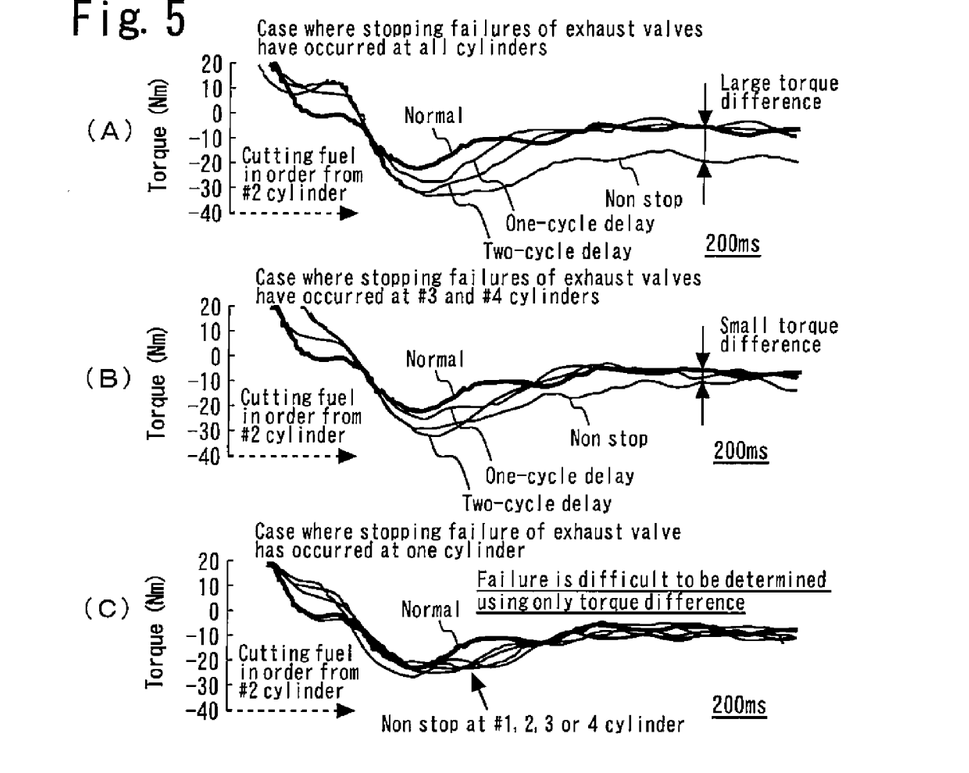
FIG. 5 is a diagram showing a torque behavior of the internal combustion engine when a stopping failure of the exhaust valve has occurred.

FIG. 5 is a diagram showing a torque behavior of the internal combustion engine 12 when a stopping failure of the exhaust valve 60 has occurred. More specifically, FIG. 5(A) shows a torque behavior of the internal combustion engine 12 when stopping failures have occurred at the exhaust valves 60 in all of the cylinders of the internal combustion engine 12; FIG. 5(B) shows a torque behavior of the internal combustion engine 12 when stopping failures have occurred at the exhaust valves 60 in #3 and #4 cylinders; and FIG. 5(C) shows a torque behavior of the internal combustion engine 12 when a stopping failure has occurred independently at the exhaust valve 60 in any one cylinder of #1 to #4 cylinders. In this connection, the examples shown in FIG. 5 are the ones in a case in which fuel cuts that is accompanied by the stopping operations of the intake and exhaust valves 58 and 60 have been performed in the order from #2 cylinder. In addition, it is assumed that in FIG. 5, the stopping operation of the intake valve 58 has been normally performed.

First, the example shown in FIG. 5(A) will be described. As shown "Normal" in FIG. 5(A), when the stopping operations of the intake and exhaust valves 58 and 60 have been normally performed, the negative work is not generated as already described, and therefore, the torque of the internal combustion engine 12 hovers at a value near zero on the minus side after largely shifting to the minus side immediately after the performance of the stopping operation. In addition, as shown in FIG. 5(A), when the stopping operation of the exhaust valve 60 has been delayed by one cycle or two cycles, the torque of the internal combustion engine 12 hovers at a value near zero on the minus side after a delay with respect to the normal time has occurred. In contrast to this, as shown "Non stop" in FIG. 5(A), when a state in which the stopping operation of the exhaust valve 60 has not been normally performed continues, the torque of the internal combustion engine 12 becomes larger than that at the normal time on the minus side, that is to say, the negative torque increases.

Next, the example shown in FIG. 5(B) will be described. FIG. 5(B) shows a case in which stopping failures have occurred at the exhaust valves 60 in two cylinders in which explosion order is successive (herein, #3 and #4 cylinders). As just described, in this case, the number of cylinders in which a stopping failure of the exhaust valve 60 has occurred becomes less than that in the case shown in FIG. 5(A). Because of this, as can be seen by comparing the case of "Non stop" in FIG. 5(B) and the case of "Non stop" in FIG. 5(A), the difference of the negative torque of the internal combustion engine 12 with respect to the negative torque at the normal time becomes smaller, that is to say, the negative torque becomes smaller, as compared with the case of FIG. 5(A) in which the stopping failures have occurred at the exhaust valves 60 in all of the cylinders.

Further, the example shown in FIG. 5(C) will be described. FIG. 5(C) shows a case in which the stopping failure has occurred independently at the exhaust valve 60 in any one cylinder of #1 to #4 cylinders. In this case, as compared with the example shown in FIG. 5(B), the difference of the negative torque of the internal combustion engine 12 with respect to the negative torque at the normal time becomes even smaller, that is to say, the negative torque becomes even smaller.

Accordingly, in the present embodiment, when an execution request for a fuel cut that is accompanied by a request to stop both of the intake and exhaust valves 58 and 60 has been issued, it is determined whether or not a stopping failure of the exhaust valve 60 has occurred on the basis of the magnitude of the negative torque of the internal combustion engine 12. More specifically, when an execution request for a fuel cut that is accompanied by a request to stop both of the intake and exhaust valves 58 and 60 has been issued, it is determined that the stopping failure of the exhaust valve 60 has occurred if a torque difference (herein, a value obtained by subtracting a value of torque at the normal time from a value of the current torque) of the current negative torque with respect to the negative torque that is in a case in which the stopping operation of the intake and exhaust valves 58 and 60 are normal is a minus value, and an absolute value of the torque difference is larger than or equal to a predetermined value.

Figure 6:
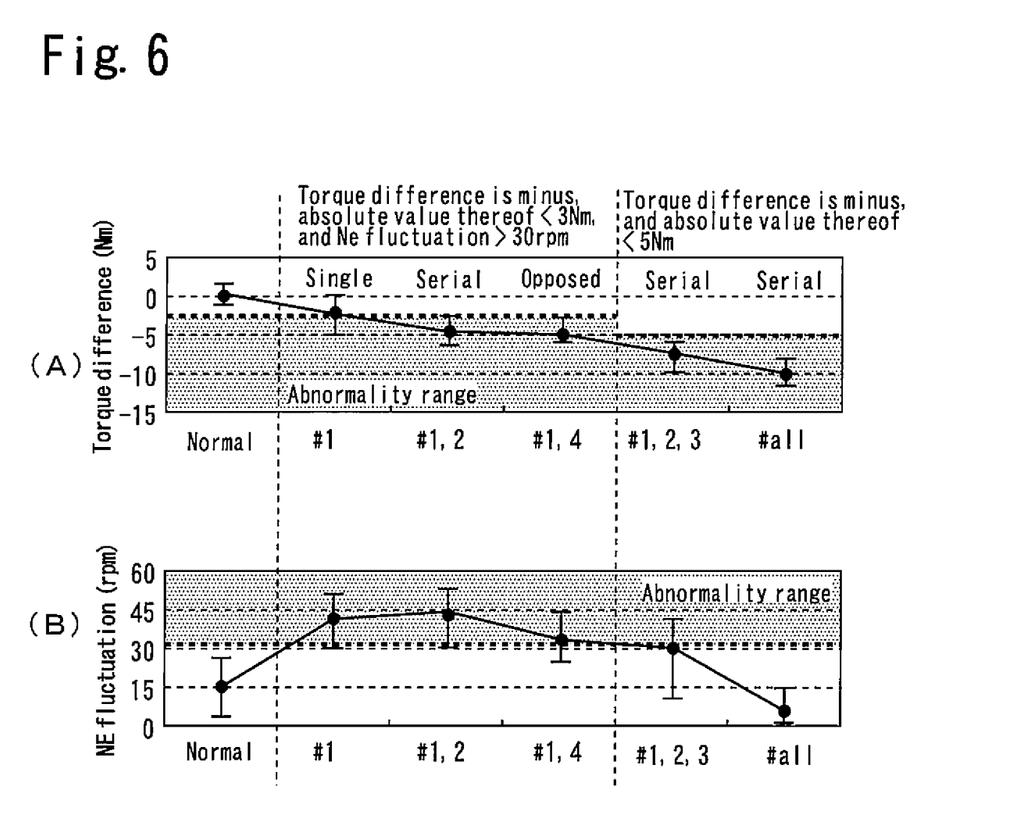
FIG. 6 is a diagram showing each of a torque difference and an engine speed fluctuation (NE fluctuation) in accordance with the manner of the stopping failure of the exhaust valve.

FIG. 6 is a diagram showing each of a torque difference and an engine speed fluctuation (NE fluctuation) in accordance with the manner of the stopping failure of the exhaust valve 60. In this connection, the value shown "Single" in FIG. 4(A) (also in FIG. 4(B)) is the one in a case in which the stopping failure of the exhaust valve 60 has occurred independently at #1 cylinder. The value shown "Serial" on the right is the one in a case in which the stopping failures of the exhaust valves 60 in #1 and #2 cylinders at which explosion order is successive have occurred. In addition, the value "Opposed" on the right is the one in a case in which the stopping failures of the exhaust valves 60 in #1 and #4 cylinders at which explosion intervals are uniform. Furthermore, the value "Serial" on the right is the one in a case in which the stopping failures of the exhaust valves 60 in #1, #2 and #3 cylinders at which explosion order is successive have occurred. Moreover, the value "Serial" on the right is the one in a case in which the stopping failures of the exhaust valves 60 in all of the cylinders have occurred.

As shown in FIG. 6(A), the aforementioned torque difference becomes larger on the minus side as the number of cylinders in which a stopping failure of the exhaust valve 60 has occurred increases. Accordingly, in the present embodiment, it is determined that when the torque difference is a minus value and the absolute value of the torque difference is larger than or equal to a predetermined value β (for example, 5 Nm), the stopping failures of the exhaust valves 60 have occurred in three or four cylinders.

If, on the other hand, the number of cylinders in which the stopping failure of the exhaust valve 60 has occurred becomes smaller, as can be seen from FIG. 6(A), the absolute value of the aforementioned torque difference that is a minus value becomes smaller. Accordingly, in the present embodiment, when the aforementioned absolute value of the torque difference is smaller than the predetermined value β, the engine speed fluctuation (NE fluctuation) is additionally used as a parameter for the determination of the stopping failure, in order to be able to detect a case in which the stopping failure of the exhaust valve 60 occurs in one or two cylinders.

When the stopping failure of the exhaust valve 60 has occurred in a part of the cylinders, a torque balance between cylinders is disrupted. The engine speed fluctuation expresses the influence of the disruption of this torque balance between cylinders, as shown in FIG. 6(B). The engine speed fluctuation becomes the largest when #1 and #2 cylinders at which explosion order is successive are the cylinders at which the failure have occurred, and the engine speed fluctuation becomes the second largest when #1 cylinder is the cylinder independently at which the failure has occurred, as shown in FIG. 6(B). In this connection, if the stopping failures of the exhaust valves 60 have occurred in two cylinders, the disruption of the torque balance becomes larger in a case in which #1 and #2 cylinders at which explosion order is successive are the cylinders at which the failures have occurred, as compared with a case in which #1 and #4 cylinders at which explosion intervals are uniform are the cylinders at which the failure has occurred. As a result, the engine speed fluctuation becomes larger.

Accordingly, in the present embodiment, if the engine speed fluctuation (more specifically, the integrated value of absolute value of a change amount ΔNE of the engine speed) is larger than a predetermined value ζ (for example, 30 rpm) in a case in which the aforementioned torque difference is a minus value and the absolute value of the torque difference is smaller than the aforementioned predetermined value β and larger than or equal to a predetermined value α (for example, 3 Nm), it is determined that the stopping failure of the exhaust valve 60 has occurred at one or two cylinders.

Figure 7:
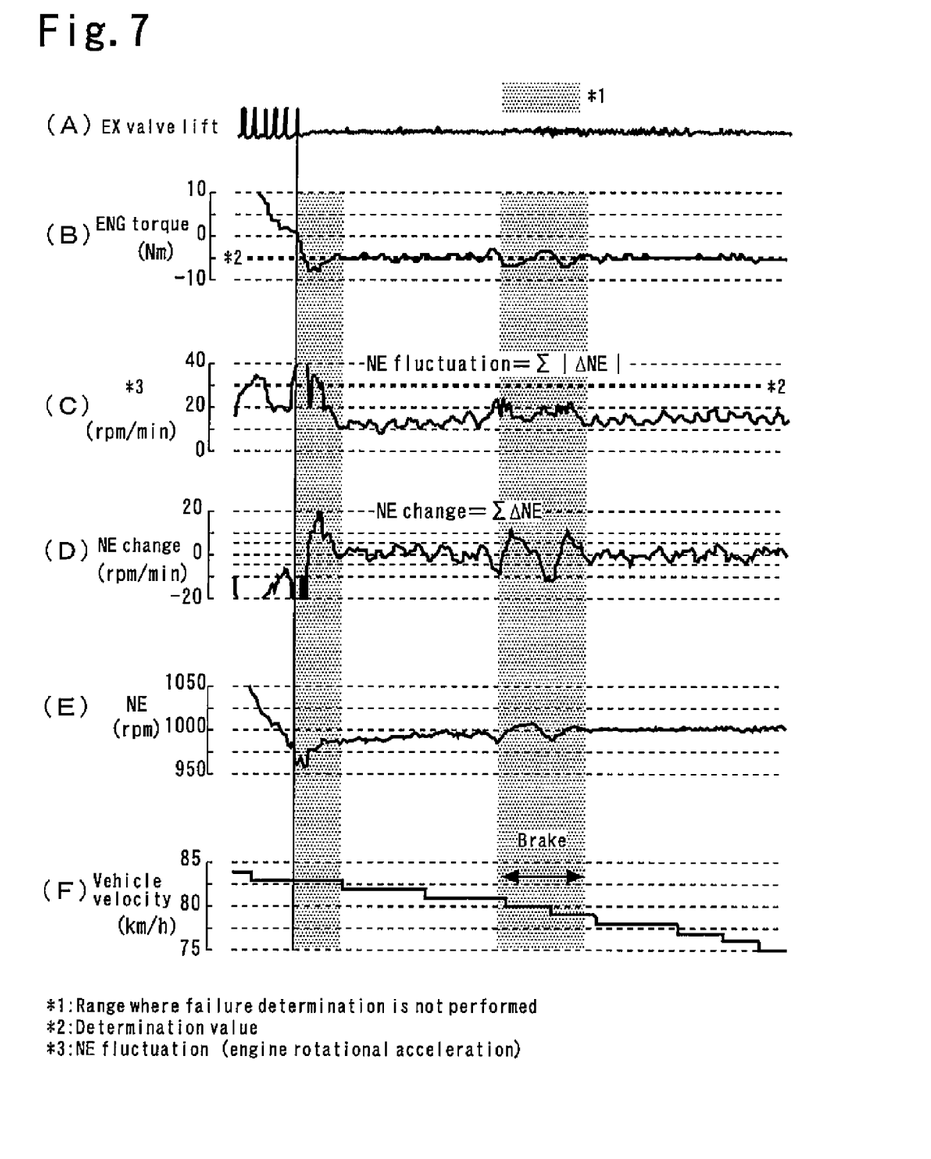
FIG. 7 is a diagram showing the operations of the hybrid vehicle equipped with the internal combustion engine in a case in which a fuel cut that is accompanied by a request to stop the intake and exhaust valves is executed.

FIG. 7 is a diagram showing the operations of the hybrid vehicle equipped with the internal combustion engine 12 in a case in which a fuel cut that is accompanied by a request to stop the intake and exhaust valves 58 and 60 is executed. In this connection, an NE change (engine rotational acceleration) in FIG. 7(D) is herein assumed to be a value that is calculated as the total value of the change amount ΔNE of the engine speed.

As shown in FIG. 7, in a case in which the engine rotational acceleration widely changes to the plus side or the minus side (a case in which the engine speed rapidly increases or rapidly decreases), such as a case of immediately after performance of the stopping operations of the intake and exhaust valves 58 and 60 or a case of braking the vehicle, noise that is superposed over the engine speed fluctuation that is used for determining the stopping failure of the exhaust valve 60 in the present embodiment increases. Accordingly, in the present embodiment, a determination processing of the stopping failure of the exhaust valve 60 is performed only in a case in which the absolute value of the engine rotational acceleration is smaller than a predetermined value γ, and the determination processing of the stopping failure of the exhaust valve 60 is prohibited in a case in which the engine rotational acceleration is larger than or equal to the aforementioned predetermined value γ.

[Concrete Processing in the First Embodiment]

Figure 8:
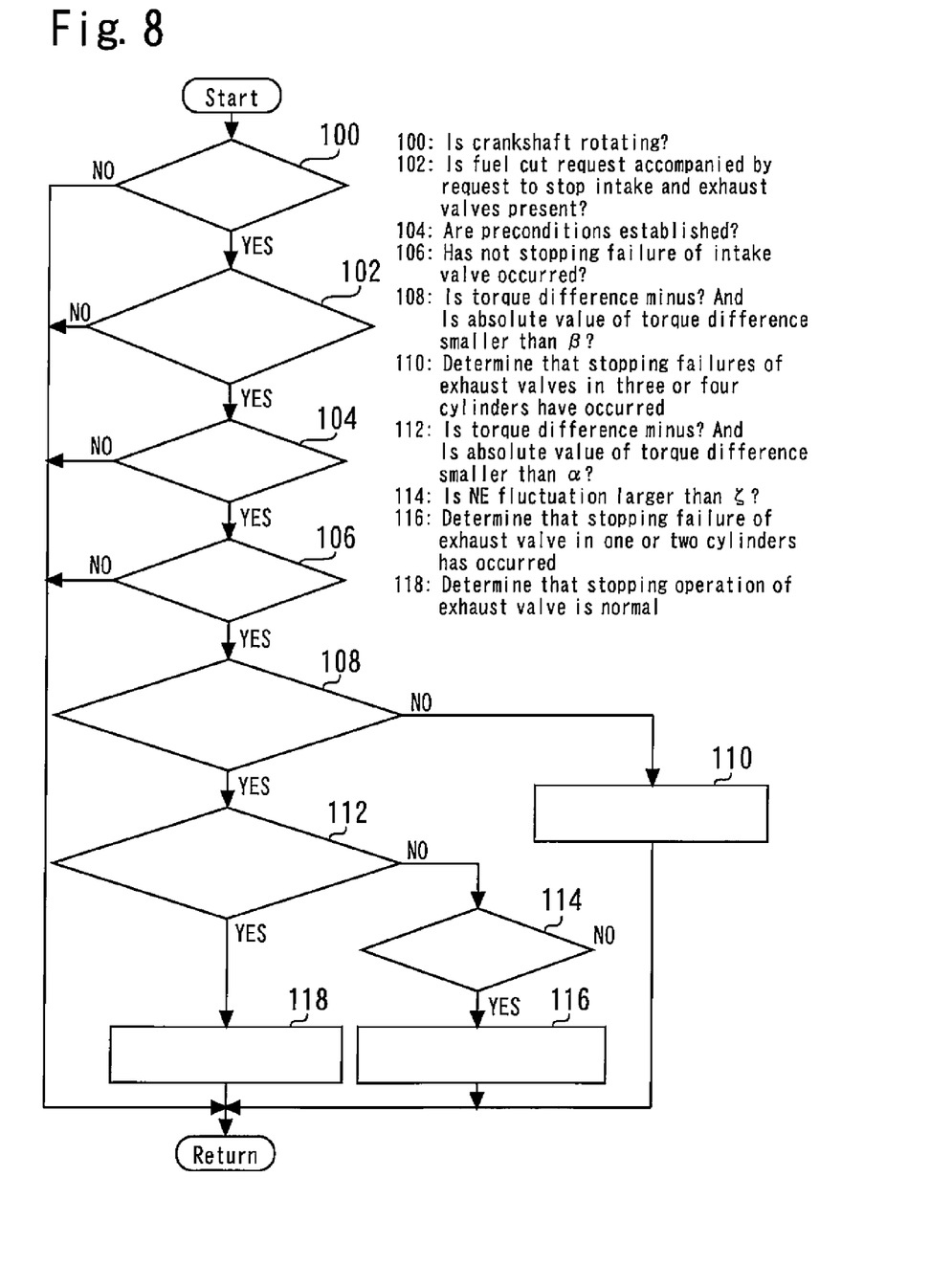
FIG. 8 is a flowchart showing a routine of a failure determination processing of the exhaust valve that is executed in the first embodiment of the present invention.

FIG. 8 is a flowchart of the routine of the failure determination processing of the exhaust valve 60 according to the first embodiment of the present invention. It is noted that the present routine is executed repeatedly at predetermined time intervals.

In the routine shown in FIG. 8, it is first determined whether or not the crankshaft 74 is rotating on the basis of the output of the crank angle sensor 68 (step 100). The internal combustion engine 12 of the present embodiment is mounted on the hybrid vehicle that is capable of stopping the operation of the internal combustion engine 12 while the vehicle is running. Therefore, according to the processing of present step 100, it is confirmed that the operation of the internal combustion engine 12 is not being stopped prior to the determination of the stopping failure of the exhaust valve 60.

If it is determined in aforementioned step 100 that the crankshaft 74 is rotating, it is determined whether or not an execution request for a fuel cut that is accompanied by a request to stop the intake and exhaust valves 58 and 60 is present (step 102). As a result of this, if the determination of present step 102 is positive, it is determined whether or not preconditions of the determination of the stopping failure of the exhaust valve 60 in the present embodiment are established, specifically, whether or not the absolute value of the engine rotational acceleration that is calculated by use of the output of the crank angle sensor 68 is smaller than the predetermined value γ (step 104). In this connection, when determining whether or not the aforementioned preconditions are established, an additional condition such as whether or not the engine cooling water temperature is higher than or equal to a predetermined warm-up temperature may be provided as well as the aforementioned determination on the engine rotational acceleration.

If the determination of aforementioned step 104 is positive, it is determined whether or not the stopping failure of the intake valve 58 has occurred (step 106). When the intake valves 58 in all of the cylinders have been normally stopped in a case in which a request to stop the intake valves 58 has been issued with respect to all of the cylinders, the intake pressure increases toward the atmospheric pressure. Therefore, it can be determined whether or not the stopping failure of the intake valve 58 has occurred on the basis of, for example, whether or not the intake pressure detected by the intake pressure sensor 72 coincides with the atmospheric pressure during execution of a fuel cut.

If it is determined in aforementioned step 106 that the stopping failure of the intake valve 58 has not occurred, it is determined whether or not the above described torque difference is a minus value and the absolute value of the torque difference is smaller than the aforementioned predetermined value β (step 108). In present step 108, in order to calculate a torque difference, a negative torque value at the normal time is obtained by use of a map (a relation such as FIG. 4) that defines, with the engine speed NE, a negative torque at the time of the stopping operations of the intake and exhaust valves 58 and 60. Then, the aforementioned torque difference is calculated by subtracting the negative torque value obtained by the aforementioned map from the current negative torque value. According to such calculation method, when the negative torque is large due to an occurrence of the stopping failure of the exhaust valve 60, the torque difference is calculated as a value that is larger on the minus side. In addition, the aforementioned predetermined value β is a threshold value that is set in advance as a value capable of determining whether or not the stopping failures of the exhaust valves 60 have occurred in three or four cylinders of the internal combustion engine 12, as shown in aforementioned FIG. 6(A).

As a result, in the present routine, if the determination of present step 108 is negative, that is, if the difference of the negative torque with respect to the negative torque at the normal time is a minus value and the absolute value of the torque difference is larger than or equal to the predetermined value β, it is determined that the stopping failures of the exhaust valves 60 have occurred in three or four cylinders (step 110).

If, on the other hand, the determination of aforementioned step 108 is positive, that is, if it is determined that the torque difference is a minus value and the absolute value of the torque difference is smaller than the predetermined value β, it is next determined whether or not the torque difference is a minus value and the absolute value of the torque difference is smaller than the predetermined value α (step 112). The aforementioned predetermined value α in present step 112 is set as a value that is larger than the aforementioned predetermined value β. In addition, the predetermined value α is a threshold value that is set in advance as a value capable of determining whether or not the stopping operations of the exhaust valves 60 in all of the cylinders are not in the normal state and the stopping failure of the exhaust valve 60 has occurred at one or two cylinders.

If the determination of aforementioned step 112 is negative, that is, it is determined that the torque difference is a minus value and the absolute value of the torque difference is larger than or equal to the predetermined value α (α≤torque difference<β), it is further determined whether or not the fluctuation of the engine speed NE is larger than the predetermined value ζ (step 114). The predetermined value ζ (in present step 114 is a threshold value that is set in advance as a value capable of determining whether or not the stopping failure of the exhaust valve 60 has occurred at one or two cylinders of the internal combustion engine 12, as shown in aforementioned FIG. 6(B). Therefore, when it is determined in present step 114 that the fluctuation of the engine speed NE is larger than the predetermined value ζ, it is determined that the stopping failure of the exhaust valve 60 has occurred at one or two cylinders (step 116).

If, on the other hand, the determination of aforementioned step 112 is positive, that is, if it is determined that the torque difference is a minus value and the absolute value of the torque difference is smaller than the predetermined value α, it is determined that the stopping operations of the exhaust valves 60 in all of the cylinders are normal (step 118).

According to the routine shown in FIG. 8 described so far, when an execution request for a fuel cut that is accompanied by a request to stop the intake and exhaust valves 58 and 60 has been issued, it is determined whether or not a stopping failure of the exhaust valve 60 has occurred, on the basis of the magnitude of the negative torque of the internal combustion engine 12 of when the stopping failure of the intake valve 58 has not occurred. As already described, in a cylinder in which the stopping operation of the exhaust valve 60 has been normally performed in a situation in which the stopping operation of the intake valve 58 in each cylinder has been normally performed, flow loss of working gas disappears and therefore, the crankshaft 74 becomes very easy to rotate. On the other hand, in a cylinder in which the stopping failure of the exhaust valve 60 has occurred, the crankshaft 74 becomes hard to rotate due to a presence of flow of the working gas via the exhaust valve 60, and the negative torque of the internal combustion engine 12 becomes larger than that in a case in which the stopping operations of both of the intake and exhaust valves 58 and 60 have been normally performed. Therefore, the aforementioned routine makes it possible to successfully determine whether or not a failure concerning the stopping operation of the exhaust valve 60 has occurred by use of the negative torque having such a tendency, without the need of providing a dedicated sensor for the failure determination.

In addition, if the torque difference of the current negative torque with respect to the negative torque at the normal time is a minus value and the absolute value of the torque difference is larger than or equal to the predetermined value β, the aforementioned routine makes it possible to determine whether or not the stopping failures of the exhaust valves 60 have occurred at a plurality of cylinders (in the present embodiment, three or four cylinders) by use of only the torque difference.

Furthermore, if the aforementioned torque difference is a minus value and the absolute value of the torque difference is smaller than the predetermined value β, that is, if the stopping failure is difficult to be determined by only the torque difference, the aforementioned routine additionally uses the engine speed fluctuation as a parameter for the failure determination and can thereby determine the stopping failure of the exhaust valve 60 successfully in a case in which the number of cylinders in which the stopping failure has occurred is small (in the present embodiment, a case in which the stopping failure has occurred at one or two cylinders).

Moreover, According to the aforementioned routine, the aforementioned determination concerning the stopping failure of the exhaust valve 60 is performed only in a case in which the absolute value of the engine rotational acceleration is smaller than the predetermined value γ. Thus, the aforementioned determination of the stopping failure of the exhaust valve is allowed to be performed in an operating region in which a noise superposed over the engine speed fluctuation is small, and erroneous determination of the stopping failure can therefore be prevented.

Moreover, the aforementioned routine performs the determination of the torque difference using the aforementioned predetermined values β and α, and thereby, it is determined that in a case in which the torque difference is large on the minus side, the number of cylinders in which a failure concerning the stopping operation of the exhaust valve 60 has occurred is larger as compared with a case in which the torque difference is small on the minus side. In this way, according to the processing of the aforementioned routine, the number of cylinders in which the stopping failure of the exhaust valve 60 has occurred can be determined.

Incidentally, in the first embodiment, which has been described above, the engine speed fluctuation is additionally used as a parameter of the determination when the torque difference of the current negative torque with respect to the negative torque at the normal time is a minus value and the absolute value of the torque difference is smaller than the predetermined value, that is, when the stopping failure is difficult to be detected by only the torque difference. However, the present invention is not limited to this, and, for example, a torque fluctuation of an internal combustion engine (obtainable, for example, using the torque sensor 70) may be added as a parameter for the failure determination in this case, instead of the engine speed fluctuation. Furthermore, when the torque difference is larger than a predetermined second determination value, a failure concerning the stopping operation of the exhaust valve may be determined to have occurred. In addition, if the present invention is applied to determine a pattern of an engine speed fluctuation or a torque fluctuation by use of a relation with a crank angle, a cylinder in which the stopping failure of the exhaust valve 60 has occurred can be identified.

In addition, in the first embodiment, which has been described above, the negative torque of the internal combustion engine 12 is obtained by use of the output of the torque sensor 70. However, the negative torque obtaining means in the present invention is not limited to this, and may, for example, obtain (calculate) a negative torque or a correlation value of the negative torque on the basis of the engine speed, the engine rotational acceleration or the like that is detected by the crank angle sensor 68.

Furthermore, in the first embodiment, which has been described above, the description of the failure determination method of the exhaust valve according to the present invention has been made by taking an example of a system in which the internal combustion engine 12 having the valve stop mechanism is mounted on the vehicle. However, the present invention is not limited to an application to a system in which an internal combustion engine having a valve stop mechanism is mounted on a vehicle, and is similarly applicable to a vehicle that is driven by only the internal combustion engine having the valve stop mechanism as its power source.

Moreover, in the first embodiment, which has been described above, the description has been made by taking an example of the internal combustion engine 12 of a straight 4-cylinder type. However, the internal combustion engine to be addressed in the present invention is not limited to the straight 4-cylinder type. More specifically, the present invention can be similarly applied to other types of internal combustion engines by changing a torque difference used for a failure determination processing and further a determination value of the engine speed fluctuation or a torque fluctuation as appropriately.

It is noted that in the first embodiment, which has been described above, the ECU 40 executes the processing of aforementioned step 106, whereby the "intake valve failure determination means" according to the first aspect of the present invention is realized; the ECU 40 obtains the negative torque of the internal combustion engine 12 by use of the output of the torque sensor 70, whereby the "negative torque obtaining means" according to the first aspect of the present invention is realized; and the ECU 40 executes a series of the processing of the routine shown in aforementioned FIG. 8, whereby the "exhaust valve failure determination means" according to the first aspect of the present invention is realized.

In addition, in the first embodiment, which has been described above, the predetermined value β corresponds to the "first determination value" according to the second aspect of the present invention.

In addition, in the first embodiment, which has been described above, the ECU 40 executes the processing of aforementioned step 114, whereby the "engine fluctuation obtaining means" according to the third aspect of the present invention is realized. Furthermore, the predetermined value ζ corresponds to the "second determination value" according to the third aspect of the present invention.

In addition, in the first embodiment, which has been described above, the ECU 40 executes the processing of aforementioned step 104, whereby the "rotational acceleration obtaining means" according to the fourth aspect of the present invention is realized. Furthermore, the predetermined value α corresponds to the "third determination value" according to the fourth aspect of the present invention.

DESCRIPTION OF SYMBOLS

10 drive system
12 internal combustion engine
14 motor
40 ECU (Electronic Control Unit)
42 piston
46 intake passage
48 exhaust passage
54 fuel injection valve
58 intake valve
60 exhaust valve
62 intake variable valve operating apparatus
64 exhaust variable valve operating apparatus
68 crank angle sensor
70 torque sensor
72 intake pressure sensor
74 crankshaft

The invention claimed is:

1. A control apparatus for an internal combustion engine, comprising:
  a valve stop mechanism that is capable of switching each operational state of an intake valve and an exhaust valve between a valve operating state and a valve closed/stopped state; and
  a controller that is configured to:
  determine whether or not a failure concerning a stopping operation of the intake valve from the valve operating state to the valve closed/stopped state has occurred;
  obtain a negative torque of an internal combustion engine; and
  determine whether or not a failure concerning a stopping operation of the exhaust valve from the valve operating state to the valve closed/stopped state has occurred, on a basis of a magnitude of the negative torque of when an execution request for a fuel cut that is accompanied by a valve stop request to switch each operational state of the intake valve and the exhaust valve from the valve operating state to the valve closed/stopped state has been issued, in a case in which it is determined that a failure concerning the stopping operation of the intake valve has not occurred,
  wherein the controller determines that a failure concerning the stopping operation of the exhaust valve has occurred, when a torque difference of a current negative torque, with respect to a negative torque of the internal combustion engine in a case in which each stopping operation of the intake valve and the exhaust valve from the valve operating state to the valve closed/stopped state has been normally performed, is a minus value, and when an absolute value of the torque difference is larger than or equal to a predetermined first determination value,
  wherein the controller is further configured to obtain an engine speed fluctuation or a torque fluctuation of the internal combustion engine, and
  wherein the controller determines that a failure concerning the stopping operation of the exhaust valve has occurred, when the engine speed fluctuation or the torque fluctuation is larger than a predetermined second determination value, in a case in which the torque difference is a minus value and the absolute value of the torque difference is smaller than the first determination value.

2. The control apparatus for an internal combustion engine according to claim 1,
wherein the controller is further configured to obtain an engine rotational acceleration, and
wherein the controller performs a determination as to whether or not a failure concerning the stopping operation of the exhaust valve has occurred, when the absolute value of the engine rotational acceleration is smaller than a predetermined third determination value.

3. The control apparatus for an internal combustion engine according to claim 1,
wherein the controller determines that the number of cylinders in which a failure concerning the stopping operation of the exhaust valve has occurred is larger in a case in which the torque difference is large on a minus side as compared with a case in which the torque difference is small on the minus side.

4. A control apparatus for an internal combustion engine, comprising:
a valve stop mechanism that is capable of switching each operational state of an intake valve and an exhaust valve between a valve operating state and a valve closed/stopped state;
intake valve failure determination means for determining whether or not a failure concerning a stopping operation of the intake valve from the valve operating state to the valve closed/stopped state has occurred;
negative torque obtaining means for obtaining a negative torque of an internal combustion engine; and
exhaust valve failure determination means for determining whether or not a failure concerning a stopping operation of the exhaust valve from the valve operating state to the valve closed/stopped state has occurred, on a basis of a magnitude of the negative torque of when an execution request for a fuel cut that is accompanied by a valve stop request to switch each operational state of the intake valve and the exhaust valve from the valve operating state to the valve closed/stopped state has been issued, in a case in which it is determined that a failure concerning the stopping operation of the intake valve has not occurred,
wherein the exhaust valve failure determination means determines that a failure concerning the stopping operation of the exhaust valve has occurred, when a torque difference of a current negative torque, with respect to a negative torque of the internal combustion engine in a case in which each stopping operation of the intake valve and the exhaust valve from the valve operating state to the valve closed/stopped state has been normally performed, is a minus value, and when an absolute value of the torque difference is larger than or equal to a predetermined first determination value,
wherein the control apparatus for the internal combustion engine further includes engine fluctuation obtaining means for obtaining an engine speed fluctuation or a torque fluctuation of the internal combustion engine, and
wherein the exhaust valve failure determination means determines that a failure concerning the stopping operation of the exhaust valve has occurred, when the engine speed fluctuation or the torque fluctuation is larger than a predetermined second determination value, in a case in which the torque difference is a minus value and the absolute value of the torque difference is smaller than the first determination value.

* * * * *